Oct. 24, 1950    H. E. HIPPS ET AL    2,526,662
BONE MEAL EXTRACTOR

Filed Dec. 10, 1946    2 Sheets-Sheet 1

*INVENTORS:*
HERBERT E. HIPPS
EUGENE J. KUPJACK
BY *M. A. Hayes*

ATT'Y

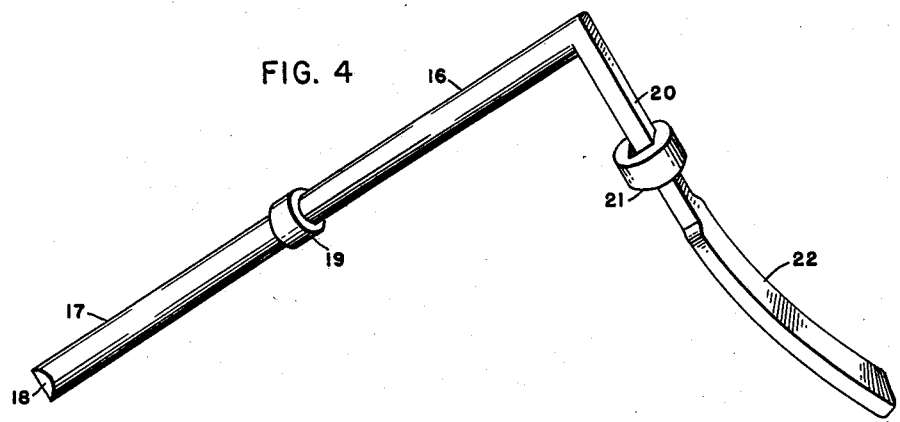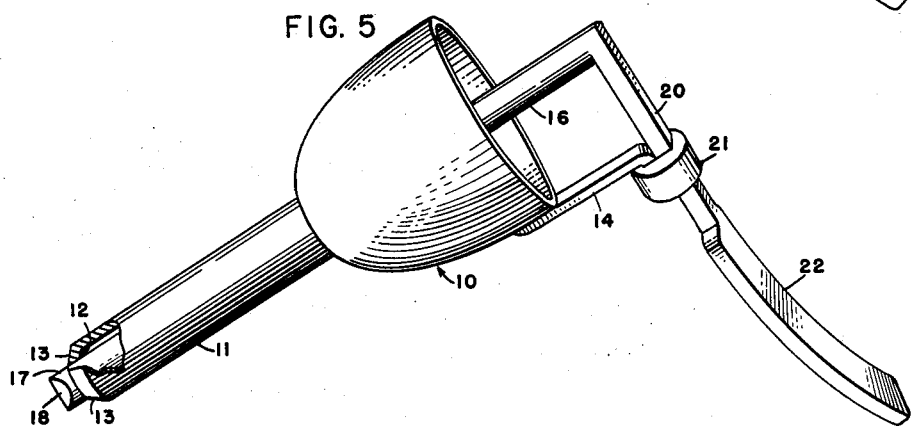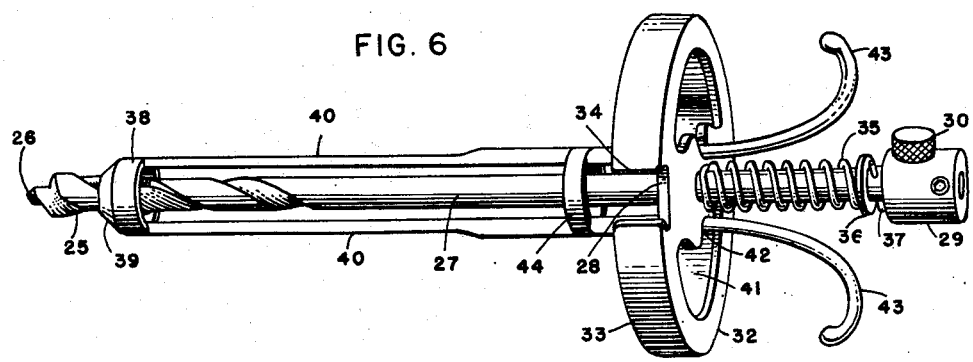

Patented Oct. 24, 1950

2,526,662

UNITED STATES PATENT OFFICE 2,526,662

BONE MEAL EXTRACTOR

Herbert E. Hipps, Waco, Tex., and Eugene J. Kupjack, Park Ridge, Ill.

Application December 10, 1946, Serial No. 715,234

10 Claims. (Cl. 128—92)

(Granted under the act of March 3, 1883, as amended April 30, 1928; 370 O. G. 757)

This invention relates to an apparatus for removing bone in the form of meal or finely divided pieces from a donor bone site, and is more particularly described as a sub-cutaneous extractor of this type.

An important object of the invention is to provide mechanical means for removing bone meal from a donor bone site through a small cutaneous incision which is easily made and closed.

A further object of the invention is to provide a sub-cutaneous extractor which can be quickly operated by one person without shock to the donor, with no appreciable loss of blood, and leaving a small scar.

Still a further object of the invention is to provide an apparatus for drilling several holes from the same starting point, and for collecting and storing the bone particles from the drill.

Other objects of the invention will appear in the specification and will be apparent from the accompanying drawings, in which:

Fig. 4 is a perspective view of a guide used to part the muscle and tissue for seating the cup end at the donor bone site;

Fig. 5 is a perspective view of the guide of Fig. 4 in place within the meal holding cup; and Fig. 6 is a perspective view of the drill assembly mounted in the cup as in Fig. 1.

Figures 1, 2, 3:
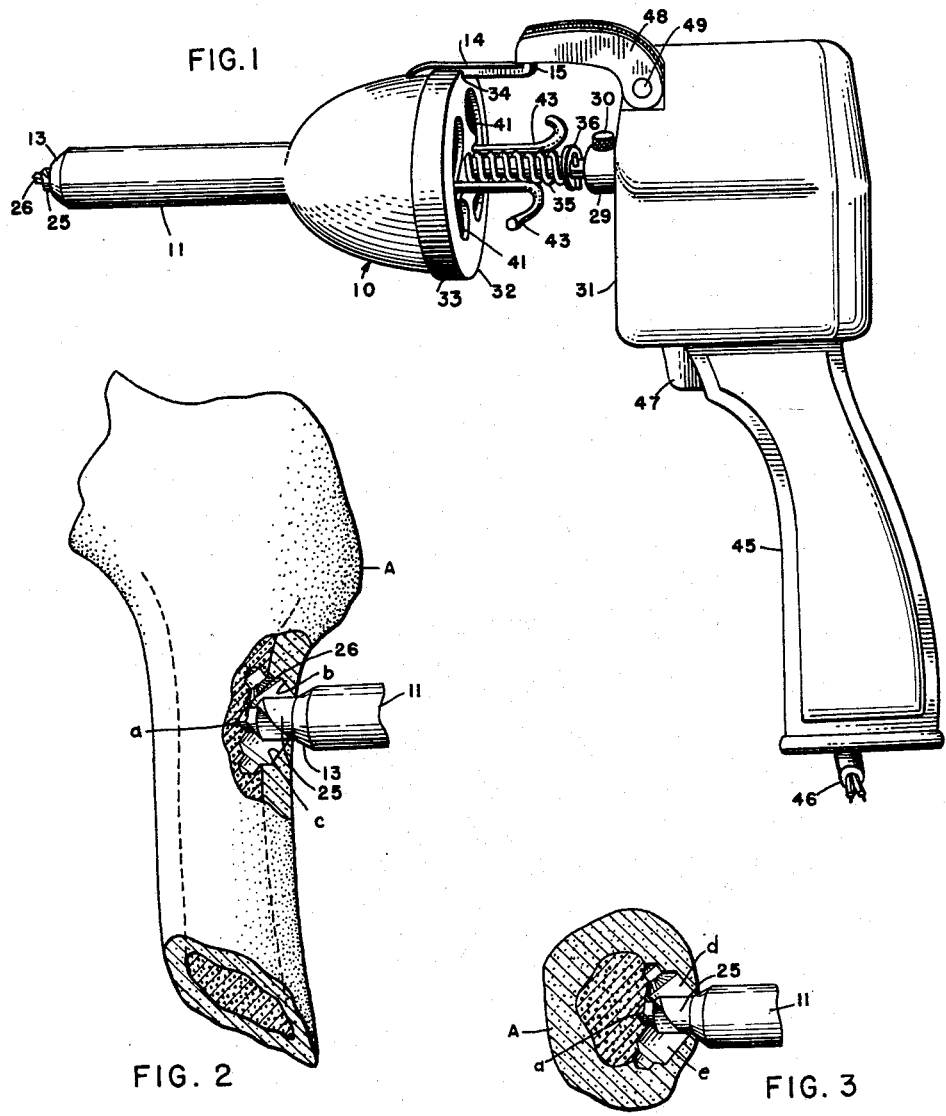
Fig. 1 is a perspective view of a bone meal extractor apparatus in accordance with this invention.
Fig. 2 is a fragmentary view of one end of a donor bone to which the drilling end of the apparatus is applied.
Fig. 3 is a cross-sectional view of the bone shown in Fig. 2, with the drill applied thereto.

It has been the practice in obtaining bone particles to go into the tibia area making a relatively large incision and requiring considerable time both for the operation itself and for the recovery therefrom, also causing considerable pain and discomfort to the donor. The present extractor requires only a small incision which is immediately closed, leaving a small scar. The donor sites are usually selected close to the thickened end portions of the femur or tibia, where the most bone meal may be obtained from the fewest sites.

The use of the bone meal method is rapidly becoming more prevalent in the field of bone surgery, and this extractor provides a simple, efficient and easily operable apparatus for obtaining it. It is usually extracted from the tibia of the person upon whom it is to be used, but may be from a suitable donor site of another person. In using the apparatus, a small incision, about one-half inch long, is made through the cuticle near the upper or lower end of the femur, or any other proposed donor site, the muscle and tissues are parted allowing a portion of the apparatus to be inserted therethrough directly in contact with the bone.

Referring now more particularly to the drawings, a cup 10 has a hollow sleeve 11 extending centrally from the bottom and the sleeve has a reduced opening at the end with an inner beveled shoulder 12 and a sharply beveled outer extremity 13. Extending from the edge of the cup is a supporting arm 14 having an outwardly bent end 15.

A parting guide 16, as shown by Fig. 4, has a lower portion 17 to fit within the reduced end opening of the sleeve 11, and the end 18 is pointed for separating fibers but need not be a sharp or cutting edge. A collar 19 is secured to the portion 17 and spaced from the end to provide a centering bearing in the sleeve 11 at the bottom of the cup 10. At the other end of the guide is an angular shank 20 extending at a right angle to closely overlie and engage the bent end 15 of the arm 14. When the shank 20 engages the bent end 15 the pointed end 18 projects from the outer beveled extremity 13 of the sleeve 10. Upon the shank a collar 21 is slidable into and out of locking engagement with this bent end 15 of the arm 14. Extending beyond the shank is a wider handle portion 22 for moving the guide alone and the cup with it when they are connected by the shank 20.

When connected as shown in Fig. 5, the pointed end 18 of the guide and the beveled extremity 13 of the sleeve are inserted through an incision in the skin against a bone. The guide is used to part and separate the skin and muscle the beveled extremity 13 of the sleeve 10 is pressed against the outside of a donor bone A. With the cup in this position the guide 16 is withdrawn by first releasing the collar 21, and a bone drilling assembly as shown in Fig. 6 is inserted in the cup.

This bone drilling assembly comprises a drill 25 having a reduced extremity 26 for entering any material more readily. Extending oppositely is a shank 27 having a collar 28 secured to or formed integrally therewith. At the end of the shank is a coupling 29 removably attached by a set-screw 30, the coupling being similarly connected to the driving shaft of an electric motor 31.

At the shank end of the drill it extends through a bearing cover 32 having a flange 33 to extend closely over the outer edge of the cup 10. One portion of the flange has a recess 34 which receives the arm 14 when the cover is applied to the cup and prevents the cover from relative turning. Surrounding the shank end of the drill is a spiral spring 35 bearing at one end against the outside of the cover and at the other end against a stop washer 36 engaging a cross pin 37 extending through the shank.

A cup-shaped bone meal rake 38 closely surrounds the main portion of the drill 25 and has a lower beveled end 39 which conforms to the inner beveled shoulder 12 of the sleeve 11 and may be moved in tight contact therewith. Extending from opposite sides of the rake are guides 40 substantially parallel with and spaced from the drill shank 27. In opposite portions of the cover 32 are openings 41 each having a recess 42 adjacent the center of the cover in which the outer portions of the guides 40 are seated. The ends of the guides are curved outwardly to form hooks 43 for finger or hand engagement in moving the rake inwardly and outwardly in the sleeve 11.

When bone particles clog the end of the sleeve, the rake may be moved to draw the particles up into the sleeve and the cup 10 until sufficient bone meal is collected. A band 44 of sheet metal is usually secured to the guides at a distance from the cover which limits the stroke of the rake 38, and as the bone meal collects in the sleeve it is gradually forced upwardly into the cup.

The drill may be rotated by a hand crank attached to the shank end, but a motor 31 of the slow speed type is preferably used. If necessary the speed of the driving shaft should be reduced so the drill operates at about seventy (70) revolutions per minute.

To support the motor 31 and the drilling assembly as shown in Fig. 1, the motor may have a handle or a hand grip 45 with current supply conductors 46 extending therefrom. A trigger switch 47 is commonly provided for controlling the current to operate and stop the motor. The motor shaft is connected directly to the drill and a separate loose connection consisting of a double or open link 48 is hinged to the motor casing by a pivot 49. The link loops over the bent extremity 15 of the holding arm 14 permitting a relative movement of the motor and drill toward the cup and limiting their movement apart.

With this construction the drilling assembly and the motor are easily held and applied to the donor site by the one hand of an operator. To apply the drill, the motor and drill are pressed against the spring 35, the cup 10 remaining relatively stationary, this movement being permitted by the open link 48. After a few turns of the drill any accumulation of bone particles may be raked from the end of the sleeve 10 by pulling outward on the hooked ends 43 of the guides 40. One spiral drill passage full of bone meal produces approximately 2 cubic centimeters of material.

In applying the drilling assembly to the donor bone site, a short incision is made through the cuticle, preferably parallel with the muscular fibers and connective tissues surrounding the bone, so that the pointed end 18 of the parting guide 16 may be used to separate the muscle and tissue parts as much as possible. This end 18 and the beveled outer extremity 13 of the sleeve 11 are inserted against the donor bone surface, the guide 16 is removed, and the drilling assembly is mounted in and on the cup and its extension sleeve.

As shown in Figs. 2 and 3 the drill 25 may be first inserted substantially at right angles to the outer surface of a donor bone A forming a recess a, and then by relatively inclining the sleeve 10 it is possible to drill several holes b, c, d and e from the same starting point. The beveled outer extremity 18 permits a considerable tilting of the sleeve while still maintaining contact with the same site through the periosteum. When one area is exhausted, the extractor is removed, and may be similarly applied at another donor site, and the small incision may be closed, usually by a single surgical stitch.

The bone meal is conveyed by the drill spirals to the interior of the sleeve 11 where it may be withdrawn by the rake 38 to the upper portion of the sleeve, and if sufficient in amount, filling the cup 10 from the bottom thereof. When the desired amount of bone meal is produced it may be removed and stored in a suitable receptacle until used.

Although we have described in some detail, a particular construction in accordance with the invention, it should be regarded as an exemplification rather than a limitation thereof, as various constructions, combinations, and arrangements of various parts may be made for effecting the desired result without departing from the spirit and scope of the invention.

This invention may be manufactured and used by or for the Government of the United States of America for governmental purposes without the payment of any royalties thereon or therefor.

We claim:

1. A bone meal extractor comprising a bone drill, a spring pressed sleeve in which the drill is rotatable and longitudinally movable having a beveled extremity from which the drill projects, the sleeve fitting closely around the drill at the beveled extremity and spaced otherwise therefrom; and a bone meal rake movable longitudinally in the space between and relatively to the drill and the sleeve.

2. A bone meal extractor comprising a spring pressed sleeve member, a bone drill rotatable and longitudinally movable in the sleeve and projecting from one end thereof, and a bone meal rake surrounding the drill in the sleeve member and movable to withdraw bone meal from the drill and to transfer it relatively upward in the sleeve.

3. A bone meal extractor comprising a cup having a sleeve extending from the bottom thereof, a bone drill extending through the cup and sleeve and projecting from the open end of the sleeve; and a bone meal rake between the sleeve and the drill movable within the sleeve relatively to the drill and operative to receive bone meal from the drill and to discharge it through the sleeve into the cup.

4. In a bone meal extractor, a cup with an extending sleeve and a supporting arm projecting from the cup, a rotatable drill extending through the cup and sleeve and removable therefrom, a motor attached at the end of the drill and spaced from the cup, and link means pivoted to the motor and engageable over the arm to limit the movement of the motor and drill in opposite directions toward and away from the cup and rotatively.

5. In a bone meal extractor, a cup with an extending sleeve and a supporting arm projecting from the cup, a drill extending through the cup and sleeve and removable therefrom, a motor attached at the end of the drill and spaced from the cup, spring means engaging the drill and tending to move the end attached to the motor and the motor away from the cup, and link means pivoted to the motor and engageable over the arm to hold the cup and the motor non-rotatably together and to permit the movement of the drill and motor against the spring and limiting their movement relative to the cup in the opposite direction.

6. In a bone meal extractor, a cup with an extending sleeve, a drill extending through the cup and sleeve and the driving end projecting out of the cup, a cover at the end of the cup with a centering opening for the drill, means including a coupling attached to the drill, and spring means engaging the coupling at the driving end of the drill and the cover tending to press this end of the drill outwardly from the cup and to draw the other end inwardly into the sleeve.

7. In a bone meal extractor, a cup with an extending sleeve, a drill extending through the cup and sleeve and the driving end projecting out of the cup, a cover at the end of the cup with a centering opening for the drill, a bone meal rake comprising a cup movable lengthwise of the drill within the sleeve, and guides extending from the rake cup through the cover and terminating in hand-hold portions by which the rake is moved in the sleeve.

8. In a bone meal extractor, a cup with an extending sleeve and a supporting arm projecting from the cup rim, a rotatable drill extending through the cup and sleeve and one end projecting out of the cup, a cover at the end of the cup having a centering opening for the drill, the cover having a recess in its flange to seat it non-rotatively around the arm, a motor having a driving connection with the projecting end of the shaft, and a link pivoted to the motor and engaging over the supporting arm to permit longitudinal movement of the drill in the cup and holding the cup and its cover against rotation relative to the motor.

9. In a bone meal extractor, a cup with a sleeve extending from the bottom thereof, a rotatable drill extending through the cup and sleeve and the driving end projecting out of the cup, a rake comprising a member surrounding the drill within the sleeve and having guides extending within the sleeve and cup parallel to the drill and the ends projecting out of the cup, and a cover at the end of the cup having a central opening for the drill and having opposite outer openings with inner recesses on opposite sides of the center in which the said guides are seated and in which they are slidable to move the rake.

10. In a bone meal extractor, a rake for a bone drill comprising a cup-like portion to surround the drill, a pair of operator guides extending substantially parallel from opposite sides thereof and spaced from a drill located therein, the outer ends of the guides having hand-hold portions for moving them and the cup-like portion, and means for confining the guides against outward movement intermediate their length.

HERBERT E. HIPPS.
EUGENE J. KUPJACK.

REFERENCES CITED

The following references are of record in the file of this patent:

UNITED STATES PATENTS

| Number | Name | Date |
|---|---|---|
| 568,932 | Wilcox | Oct. 6, 1896 |
| 1,147,408 | Kells | July 20, 1915 |
| 1,242,314 | Bean | Oct. 9, 1917 |
| 2,246,916 | Fischer | June 24, 1941 |